(12) United States Patent
Salter et al.

(10) Patent No.: US 11,505,143 B2
(45) Date of Patent: Nov. 22, 2022

(54) SUPERCAPACITOR MOUNTING ASSEMBLIES AND VEHICLE MOUNTING LOCATIONS

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); David Brian Glickman, Southfield, MI (US); Zeljko Deljevic, Plymouth, MI (US); John Budaj, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 389 days.

(21) Appl. No.: 16/286,801

(22) Filed: Feb. 27, 2019

(65) Prior Publication Data

US 2020/0269785 A1 Aug. 27, 2020

(51) Int. Cl.
*B60R 16/033* (2006.01)
*B62D 25/08* (2006.01)
(Continued)

(52) U.S. Cl.
CPC .......... *B60R 16/033* (2013.01); *B62D 25/081* (2013.01); *H01G 11/18* (2013.01); *H01G 11/78* (2013.01); *B60K 1/04* (2013.01); *B60K 11/06* (2013.01); *B60K 11/08* (2013.01); *B60K 2001/005* (2013.01);
(Continued)

(58) Field of Classification Search
CPC ...... B62D 25/081; H01G 11/18; H01G 11/78; H01G 2/08; H01G 2/04; H01G 11/82; B60R 16/033; B60R 16/04; B60Y 2400/114; Y02T 10/70; Y02E 60/13; B60K 11/06;
(Continued)

(56) References Cited

U.S. PATENT DOCUMENTS 4,905,860 A * 3/1990 Kurihara ................ H04R 1/025
220/675
6,633,089 B2 * 10/2003 Kimura ............... B60R 16/0215
174/72 A
(Continued)

FOREIGN PATENT DOCUMENTS

CN 203882809 U 10/2014
CN 104319111 A 1/2015
(Continued)

*Primary Examiner* — D Glenn Dayoan
*Assistant Examiner* — Dana D Ivey
(74) *Attorney, Agent, or Firm* — Vichit Chea; Carlson, Gaskey & Olds, P.C.

(57) ABSTRACT

This disclosure is directed to supercapacitor systems for supporting relatively high power transient electrical loads within vehicles. An exemplary supercapacitor system includes a mounting assembly and a supercapacitor housed within the mounting assembly. The mounting assembly may be employed to mount the supercapacitor system within a vehicle, such as within a cowl assembly or cargo space of the vehicle. The mounting assembly may include multiple panels. At least one of the multiple panels may be made of a thermally conductive polymer, and at least one other panel of the multiple panels may be made of a polymer that is reinforced by a structural foam.

20 Claims, 5 Drawing Sheets

Section A-A

(51) Int. Cl.
*H01G 11/78* (2013.01)
*H01G 11/18* (2013.01)
*H01G 2/08* (2006.01)
*H01G 2/04* (2006.01)
*H01G 11/82* (2013.01)
*B60K 11/06* (2006.01)
*B60K 11/08* (2006.01)
*B60K 1/00* (2006.01)
*B60K 1/04* (2019.01)
*B60R 16/04* (2006.01)

(52) U.S. Cl.
CPC ....... *B60K 2001/0411* (2013.01); *B60R 16/04* (2013.01); *B60Y 2400/114* (2013.01); *H01G 2/04* (2013.01); *H01G 2/08* (2013.01); *H01G 11/82* (2013.01); *Y02E 60/13* (2013.01); *Y02T 10/70* (2013.01)

(58) Field of Classification Search
CPC .............. B60K 11/08; B60K 2001/005; B60K 2001/0411; B60K 1/04
USPC ................................................ 296/192, 39.3
See application file for complete search history.

(56) References Cited

U.S. PATENT DOCUMENTS

| | | | |
|---|---|---|---|
| 7,185,725 B2 * | 3/2007 | Iwasaka | B60H 1/00207 180/69.24 |
| 7,357,446 B2 * | 4/2008 | Sakai | B60R 21/34 296/192 |
| 7,744,991 B2 * | 6/2010 | Fischer | B32B 5/18 428/317.9 |
| 9,887,440 B2 | 2/2018 | Kubota et al. | |
| 2013/0264325 A1 * | 10/2013 | Nemesh | B60L 3/04 219/202 |
| 2016/0141737 A1 * | 5/2016 | Kubota | H01M 10/6555 429/120 |
| 2016/0319730 A1 * | 11/2016 | Kemmerling | F02B 37/164 |
| 2017/0341592 A1 * | 11/2017 | Ito | H04R 1/025 |
| 2018/0201108 A1 * | 7/2018 | Okuda | B60L 50/64 |

FOREIGN PATENT DOCUMENTS

| | | | | |
|---|---|---|---|---|
| CN | 204537864 U | 8/2015 | | |
| CN | 106128779 A | 11/2016 | | |
| JP | 2005210070 A | * 8/2005 | ............ | H01G 11/78 |
| WO | WO-2011109699 A1 | * 9/2011 | ............ | B29C 44/128 |
| WO | 2015/158155 A1 | 10/2015 | | |

* cited by examiner

Section A-A

Section B-B

SUPERCAPACITOR MOUNTING ASSEMBLIES AND VEHICLE MOUNTING LOCATIONS

TECHNICAL FIELD

This disclosure relates to supercapacitor systems for supporting electrical loads, and more particularly to mounting assemblies for mounting supercapacitors within vehicles.

BACKGROUND

Supercapacitors, also referred to as ultracapacitors, are relatively high capacity energy storage devices that can be used in a wide variety of applications for supporting high power transient electrical loads. Supercapacitors have not found widespread use in modern day automotive vehicles. A primary reason for the lack of widespread use of supercapacitors relates to their relatively low maximum operating temperature (e.g., around 85 degrees Celsius/185 degrees Fahrenheit).

SUMMARY

A vehicle according to an exemplary aspect of the present disclosure includes, among other things, a supercapacitor system including a mounting assembly and a supercapacitor housed within the mounting assembly. A first panel of the mounting assembly is comprised of a thermally conductive polymer and a second panel of the mounting assembly is comprised of a polymer that is reinforced by a structural foam.

In a further non-limiting embodiment of the foregoing vehicle, the supercapacitor system is packaged within a windshield cowl assembly of the vehicle.

In a further non-limiting embodiment of either of the foregoing vehicles, the supercapacitor system is packaged within a cargo space of the vehicle.

In a further non-limiting embodiment of any of the foregoing vehicles, the thermally conductive polymer is polypropylene that is loaded with a conductive filler.

In a further non-limiting embodiment of any of the foregoing vehicles, the conductive filler includes aluminum nitride or boron nitride.

In a further non-limiting embodiment of any of the foregoing vehicles, the polymer is polypropylene.

In a further non-limiting embodiment of any of the foregoing vehicles, the structural foam includes acrylonitrile-butadiene-styrene, polystyrene, polycarbonate, or polyvinyl chloride.

In a further non-limiting embodiment of any of the foregoing vehicles, the mounting assembly is a molded, box-shaped housing that includes a front panel, a rear panel, opposing side panels, a top panel, and a bottom panel.

In a further non-limiting embodiment of any of the foregoing vehicles, a first vent opening is between the front panel and the top panel and a second vent opening is formed in the bottom panel.

In a further non-limiting embodiment of any of the foregoing vehicles, the first panel is a rear panel of the mounting assembly and the second panel is a front panel of the mounting assembly.

In a further non-limiting embodiment of any of the foregoing vehicles, a third panel of the mounting assembly is comprised of the polymer that is reinforced by the structural foam.

In a further non-limiting embodiment of any of the foregoing vehicles, the third panel is a top panel, a bottom panel, or a side panel of the mounting assembly.

A vehicle according to another exemplary aspect of the present disclosure includes, among other things, a windshield, a cowl assembly positioned at a base of the windshield, a mounting assembly mounted within an open space of the cowl assembly, and a supercapacitor housed within the mounting assembly.

In a further non-limiting embodiment of the foregoing vehicle, the mounting assembly is non-contiguous with a cowl box of the cowl assembly.

In a further non-limiting embodiment of either of the foregoing vehicles, the cowl assembly includes a cowl box including a front wall, a rear wall, and a bottom wall extending between the front wall and the rear wall.

In a further non-limiting embodiment of any of the foregoing vehicles, a rear panel of the mounting assembly is mechanically fastened to the rear wall of the cowl box.

In a further non-limiting embodiment of any of the foregoing vehicles, a thermal pad is disposed between the rear panel and the rear wall.

In a further non-limiting embodiment of any of the foregoing vehicles, a first gap extends between a front panel of the mounting assembly and the front wall of the cowl box, and a second gap extends between a bottom panel of the mounting assembly and the bottom wall of the cowl box.

In a further non-limiting embodiment of any of the foregoing vehicles, at least one panel of the mounting assembly is comprised of a thermally conductive polymer.

In a further non-limiting embodiment of any of the foregoing vehicles, at least one panel of the mounting assembly is comprised of a polymer that is reinforced by a structural foam.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details supercapacitor systems for supporting relatively high power transient electrical loads within vehicles. An exemplary supercapacitor system includes a mounting assembly and a supercapacitor housed within the mounting assembly. The mounting assembly may be employed to mount the supercapacitor system within a vehicle, such as within a cowl assembly or cargo space of the vehicle. The mounting assembly may include multiple panels. At least one of the multiple panels may be made of a thermally conductive polymer, and at least one other panel of the multiple panels may be made of a polymer that is reinforced by a structural foam. These and other features of this disclosure are described in greater detail below.

Figure 1:
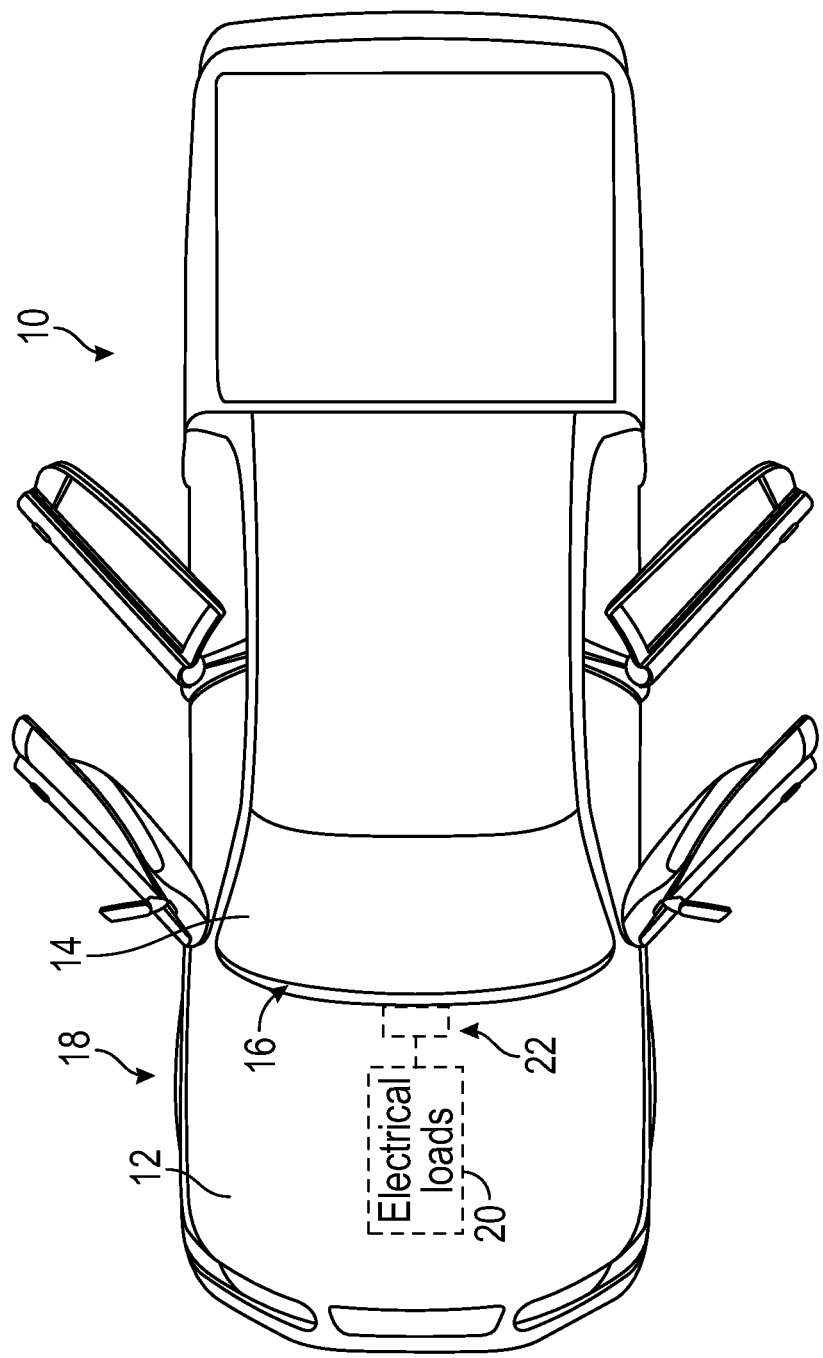
FIG. 1 schematically illustrates a vehicle equipped with a supercapacitor system.

FIG. 1 schematically illustrates a vehicle 10. The vehicle 10 may be a car, a truck, a van, a sport utility vehicle, or any other type of vehicle. The vehicle 10 could also be a conventional engine powered motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle may include a hood 12, a windshield 14, and a cowl assembly 16 located at a base of the windshield 14. The hood 12, the windshield 14, and the cowl assembly 16 may be part of a front end assembly 18 of the vehicle 10.

The vehicle 10 may additionally include various electrical loads 20 that require power in order to operate. The electrical loads 20 may include but are not limited to electric power steering systems, electric brake booster systems, electric steering systems, radar/LIDAR systems, camera systems, start/stop systems, electronic door lock systems, regenerative braking systems, security systems, etc. The electrical loads 20 may be housed within the front end assembly 18 or elsewhere within the vehicle 10.

A supercapacitor system 22 may be provided on the vehicle 10 for supporting the various electrical loads 20. The supercapacitor system 22 may include one or more supercapacitor cells that are configured to store and deliver energy for selectively powering the electrical loads 20. Each supercapacitor cell may generally include two electrodes and an electrolyte that ionically connects the electrodes for storing an electrical charge via electrochemical and electrostatic processes.

In an embodiment, the supercapacitor system 22 is packaged at a location near the cowl assembly 16. In another embodiment, the supercapacitor system 22 is packaged at a location that is relatively close to the electrical loads 20 that are being powered by the supercapacitor system 22. Exemplary mounting assemblies and mounting locations for conveniently and economically packaging the supercapacitor system 22 are further detailed below.

Figure 2:
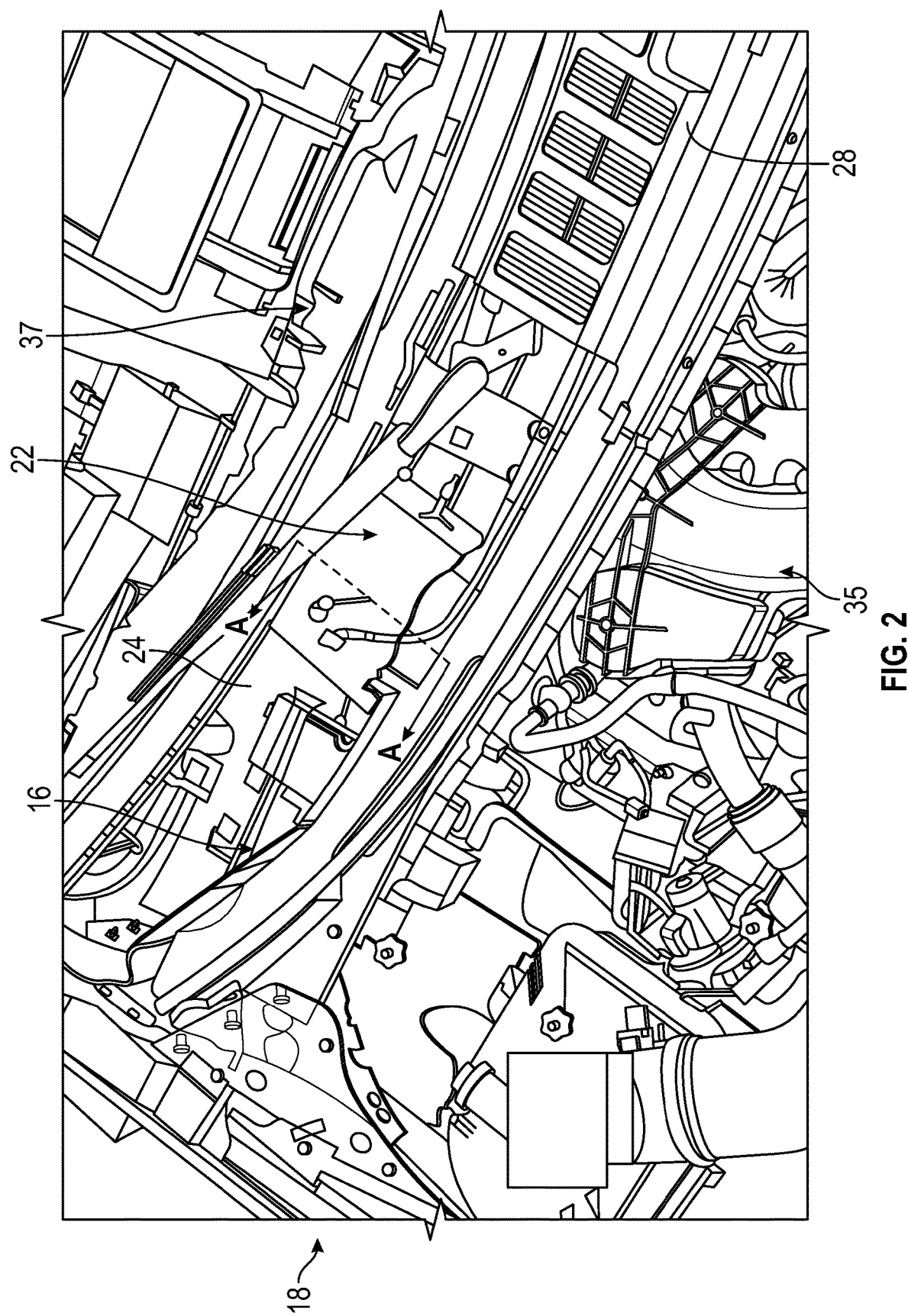
FIG. 2 illustrates an exemplary vehicle mounting location of a supercapacitor system according to a first embodiment of this disclosure.

FIG. 2 illustrates select portions of the front end assembly 18 of the vehicle 10 of FIG. 1. The hood 12 and the windshield 14 of the vehicle 10 are removed in FIG. 2 to better illustrate an exemplary mounting location of the supercapacitor system 22.

In an embodiment, the supercapacitor system 22 is packaged within an open space 24 established by the cowl assembly 16 of the front end assembly 18. Although shown and described throughout this disclosure as being packaged relative to the cowl assembly 16, the supercapacitor system 22 could be mounted at other locations within the vehicle 10, including but not limited to within a cargo space of the vehicle (see, e.g., FIG. 7, described infra). Moreover, although shown as including a single supercapacitor system 22, the vehicle 10 could be equipped with multiple supercapacitor systems for supporting various electrical loads within the scope of this disclosure.

Figure 3:
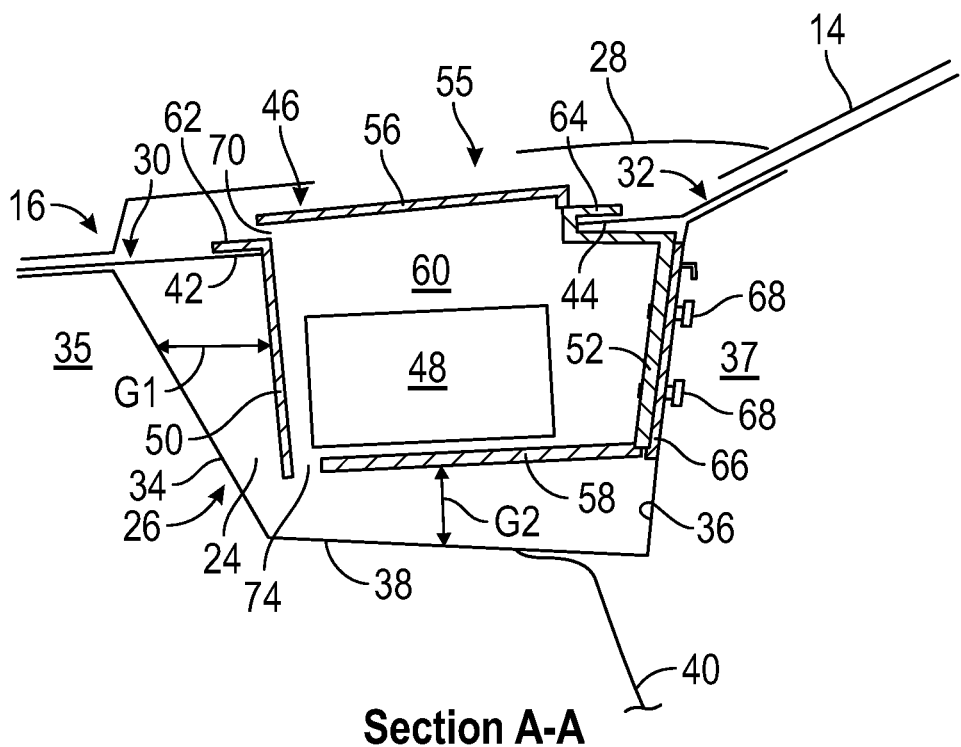
FIG. 3 is a cross-sectional view taken through section A-A of FIG. 2.

Referring now to FIGS. 2-3, the cowl assembly 16 may include a cowl box 26, a leaf screen 28, a front upper panel 30, and a rear upper panel 32. The open space 24 for receiving the supercapacitor system 22 may extend vertically between the leaf screen 28 and the cowl box 26 and horizontally between the front upper panel 30 and the rear upper panel 32. The leaf screen 28 may include one or more openings 55 for allowing heat to dissipate out of the cowl assembly 16.

The cowl box 26 of the cowl assembly 16 may include a front wall 34 that generally separates the cowl assembly 16 from an engine compartment 35 of the vehicle 10, a rear wall 36 that generally separates the cowl assembly 16 from a dashboard area 37 of the vehicle 10, and a bottom wall 38 that connects between the front wall 34 and the rear wall 36. A dash panel 40 may be positioned in contact with the bottom wall 38 for supporting the cowl box 26.

The front upper panel 30 of the cowl assembly 16 may be fixedly mounted (e.g., welded, mechanically fastened, etc.) between the front wall 34 of the cowl box 26 and the leaf screen 28, and the rear upper panel 32 of the cowl assembly 16 may be fixedly mounted (e.g., welded, mechanically fastened, etc.) between the rear wall 36 of the cowl box 26 and the windshield 14. In an embodiment, the front upper panel 30 establishes a first cantilevered support 42 for supporting a first portion of the supercapacitor system 22 relative to the cowl assembly 16, and the rear upper panel 32 establishes a second cantilevered support 44 for supporting a second portion of the supercapacitor system 22.

Figure 4:
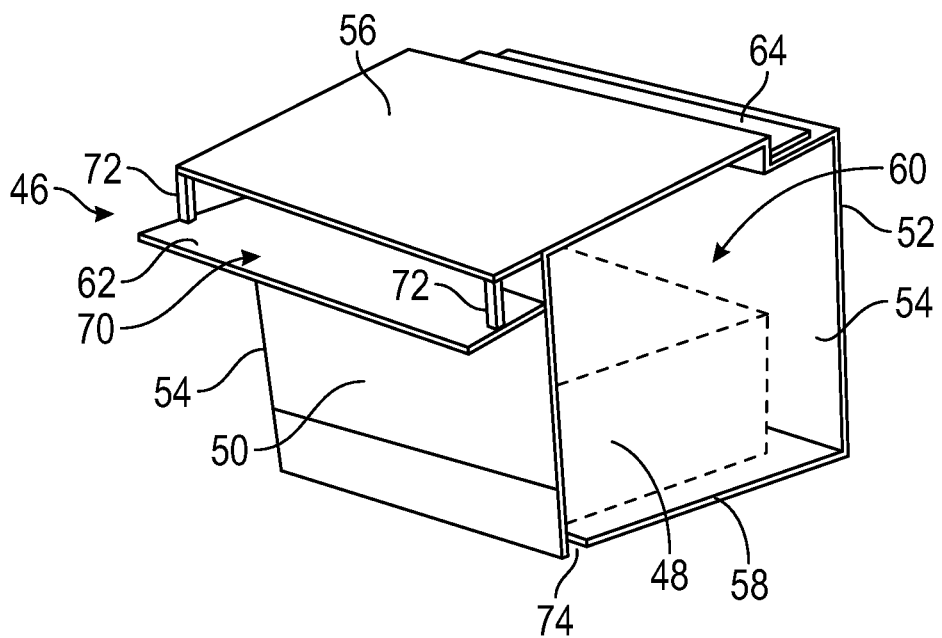
FIG. 4 is a perspective view of a mounting assembly of a supercapacitor system.

Referring now to FIGS. 3-4, the supercapacitor system 22 may include a mounting assembly 46 and one or more supercapacitors 48 that are housed within the mounting assembly 46. The mounting assembly 46 may be a molded, box-shaped housing that includes a front panel 50, a rear panel 52, opposing side panels 54, a top panel 56, and a bottom panel 58. Together, the front panel 50, the rear panel 52, the opposing side panels 54, the top panel 56, and the bottom panel 58 establish an interior 60 for housing the supercapacitor 48. The supercapacitor 48 may be positioned atop the bottom panel 58 once positioned within the interior 60.

In an embodiment, the mounting assembly 46 is mounted relative to the cowl assembly 16 without any of the panels 50-58 of the mounting assembly 46 directly contacting the walls 34-38 of the cowl box 26. For example, the front panel 50 of the mounting assembly 46 may include a first flange 62 that is supported by the first cantilevered support 42, and the rear panel 52 of the mounting assembly 46 may include a second flange 64 that is supported by the second cantilevered support 44. In this way, the mounting assembly 46 may be suspended within the open space 24 such that a first gap G1 extends between the front wall 34 of the cowl box 26 and the front panel 50 of the mounting assembly 46 and a second gap G2 extends between the bottom wall 38 of the cowl box 26 and the bottom panel 58 of the mounting assembly 46. The first and second gaps G1, G2 substantially reduce the likelihood of heat being conducted into the mounting assembly 46 from the cowl box 26.

In addition, a thermal pad 66 may be positioned between the rear panel 52 of the mounting assembly 46 and the rear wall 36 of the cowl box 26. The rear panel 52 is therefore substantially non-contiguous with the rear wall 36. The thermal pad 66 may be configured to facilitate heat transfer from the mounting assembly 46 into the cowl box 26.

One or more fasteners 68 (e.g., bolts, screws, etc.) may be utilized to mount the mounting assembly 46 relative to the cowl box 26. In an embodiment, the fasteners 68 extend through each of the rear panel 52 of the mounting assembly 46, the thermal pad 66, and the rear wall 36 of the cowl box 26.

The top panel 56 of the mounting assembly 46 may act as a shield for substantially preventing moisture ingress into the interior 60 of the mounting assembly 46. The top panel 56 may be sloped at a slight angle to induce run-off of any moisture that might accumulate on top of the mounting assembly 46.

In an embodiment, a vent opening 70 extends between the top panel 56 and the front panel 50 of the mounting assembly 46. The top panel 56 may be held above the front panel 50 by one or more rods 72 in order to establish the vent opening 70. The vent opening 70 provides for passive cooling/air circulation within the interior 60. In another embodiment, an additional vent opening 74 is provided in the bottom panel 58 of the mounting assembly 46 for providing passive cooling/air circulation within the interior 60 and for providing drainage of any moisture that may accumulate inside the interior 60.

Figure 5:
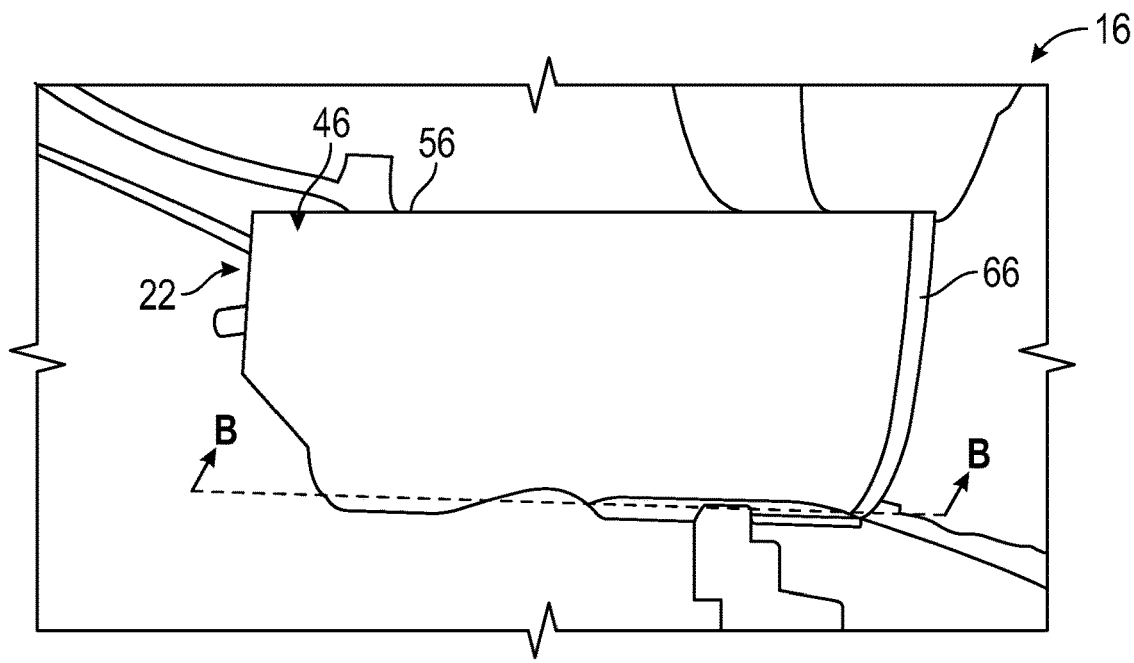
FIG. 5 is a side view of the supercapacitor system of FIG. 2.
Figure 6:
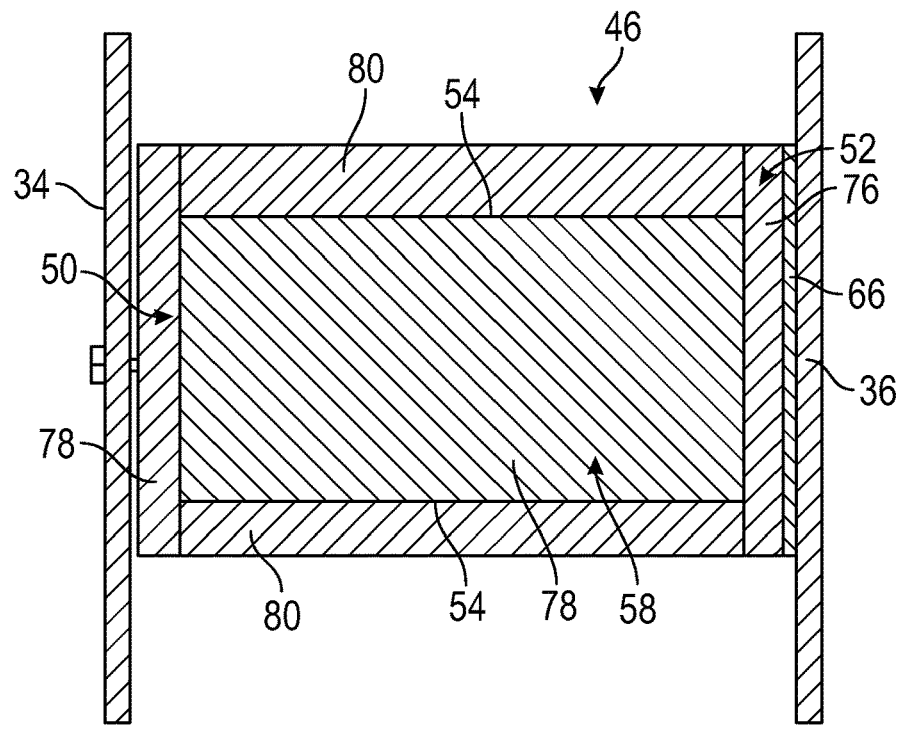
FIG. 6 is a cross-sectional view taken through section B-B of FIG. 5.

FIG. 5 is a side view of the supercapacitor system 22 packaged at its mounting location within the cowl assembly 16, and FIG. 6 is a cross-sectional view through section B-B of the supercapacitor system 22 of FIG. 5. These figures are provided to illustrate the construction and material make-up of the mounting assembly 46 of the supercapacitor system 22.

The mounting assembly 46 of the supercapacitor system 22 may be molded out of various polymeric materials. For example, the rear panel 52 of the mounting assembly 46 may be constructed from a thermally conductive polymer 76. The thermally conductive polymer 76 is configured to conduct heat from the mounting assembly 46 into the rear wall 36 of the cowl box 26 while also electrically insulating the supercapacitor 48 from the rear wall 36 of the cowl box 26, which is made of a sheet metal.

In an embodiment, the thermally conductive polymer 76 is polypropylene that is loaded with a conductive filler, such as aluminum nitride or boron nitride. However, other materials are also contemplated within the scope of this disclosure. The conductive filler may increase the conductivity of the polymer by a factor of twenty or more.

In an embodiment, the polypropylene may be loaded with about 20% (by weight of final compound) of aluminum nitride fillers in order to increase the conductivity of the rear panel 52. In another embodiment, the polypropylene may be loaded with about 40% (by weight of final compound) boron nitride fillers in order to increase the conductivity of the rear panel 52. The polypropylene may be loaded with between about 10% and about 60% (by weight of final compound) of either aluminum nitride or boron nitride fillers in order to increase the conductivity of the rear panel 52. To "load" the polymer with the conductive fillers, a percentage by weight of the conductive filler may be added to the extruder when compounding the thermally conductive polymer 76.

Each of the front panel 50, the opposing side panels 54, the top panel 56, and the bottom panel 58 of the mounting assembly 46 may be constructed out of a standard (i.e., unfilled) polymer 78. The polymer 78 includes a relatively low thermal conductivity and therefore insulates the supercapacitor 48 from heat being conducted from the cowl assembly 16 into the interior 60 of the mounting assembly 46. In an embodiment, the polymer 78 is polypropylene. However, other materials are also contemplated within the scope of this disclosure.

The polymer 78 of each of the front panel 50, the opposing side panels 54, the top panel 56, and the bottom panel 58 of the mounting assembly 46 may be reinforced by a structural foam 80. The structural foam 80 may be applied using an injection molding process and is configured to further reduce the amount of heat that is conducted from the cowl assembly 16 into the interior 60 of the mounting assembly 46. The structural foam 80 may include acrylonitrile-butadiene-styrene, polystyrene, polycarbonate, polyvinyl chloride, or any other foam materials or combinations of foam materials.

Figure 7:
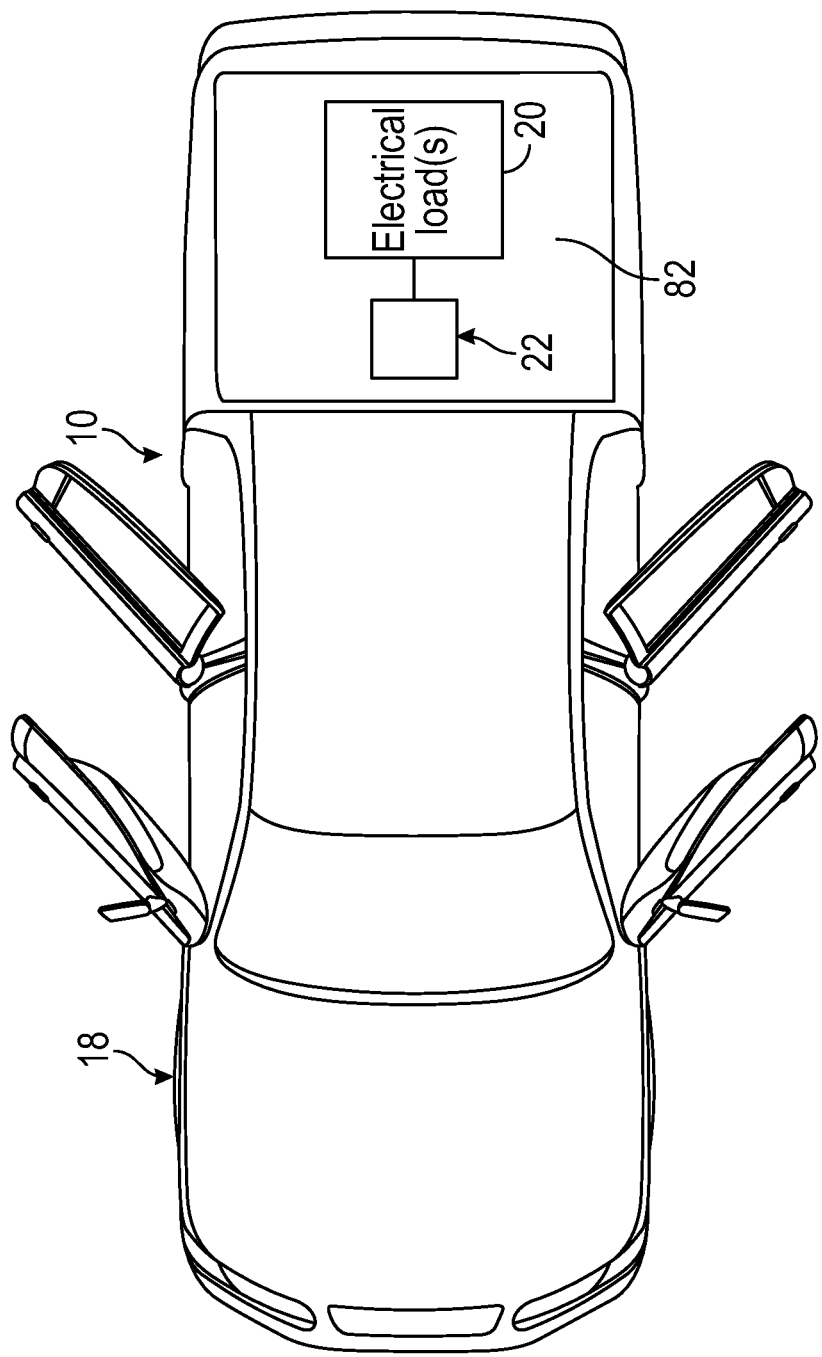
FIG. 7 illustrates an exemplary vehicle mounting location of a supercapacitor system according to a second embodiment of this disclosure.

FIG. 7 illustrates another exemplary mounting location of a supercapacitor system 22 relative to a vehicle 10. In this embodiment, the supercapacitor system 22 is mounted within a cargo space 82 of the vehicle. The cargo space 82 may be located rearward of the front end assembly 18 of the vehicle 10. The supercapacitor system 22 may be packaged immediately adjacent to the electrical loads 20 that it supports, thereby providing an economical packaging configuration.

The supercapacitor systems described herein provide highly economical mounting assemblies that may be conveniently packaged within a cowl assembly or cargo space of vehicles. The mounting assemblies may be constructed from a unique combination of materials/manufacturing techniques for thermally managing the supercapacitors housed therein. The mounting assemblies may advantageously achieve the thermal management of the supercapacitors using a combination of conduction, insulation, and passive cooling/air circulation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A vehicle, comprising:
   a windshield;
   a cowl assembly positioned at a base of the windshield;
   a mounting assembly mounted within an open space of the cowl assembly; and
   a supercapacitor housed within the mounting assembly, wherein at least one panel of the mounting assembly is comprised of a thermally conductive polymer.
2. The vehicle as recited in claim 1, wherein the mounting assembly is non-contiguous with a cowl box of the cowl assembly.

3. The vehicle as recited in claim 1, wherein the cowl assembly includes a cowl box including a front wall, a rear wall, and a bottom wall extending between the front wall and the rear wall.

4. The vehicle as recited in claim 3, wherein a rear panel of the mounting assembly is mechanically fastened to the rear wall of the cowl box, and comprising a thermal pad disposed between the rear panel and the rear wall.

5. The vehicle as recited in claim 3, wherein a first gap extends between a front panel of the mounting assembly and the front wall of the cowl box, and a second gap extends between a bottom panel of the mounting assembly and the bottom wall of the cowl box.

6. The vehicle as recited in claim 1, wherein the thermally conductive polymer is polypropylene that is loaded with an aluminum nitride or boron nitride conductive filler.

7. The vehicle as recited in claim 1, comprising an electrical load powered by the supercapacitor.

8. The vehicle as recited in claim 1, wherein the mounting assembly is a molded, box-shaped housing that includes a front panel, a rear panel, opposing side panels, a top panel, and a bottom panel.

9. The vehicle as recited in claim 8, comprising a first vent opening between the front panel and the top panel, and a second vent opening formed in the bottom panel.

10. The vehicle as recited in claim 8, wherein the top panel is sloped at an angle to induce moisture run-off.

11. The vehicle as recited in claim 1, wherein the cowl assembly includes a first cantilevered support for supporting a first portion of the mounting assembly and a second cantilevered support for supporting a second portion of the mounting assembly.

12. The vehicle as recited in claim 11, wherein the first cantilevered support supports a first flange of a front panel of the mounting assembly and the second cantilevered support supports a second flange of a rear panel of the mounting assembly.

13. The vehicle as recited in claim 1, wherein the mounting assembly is suspended within the open space of the cowl assembly such that a first gap extends between a front wall of a cowl box of the cowl assembly and a front panel of the mounting assembly and a second gap extends between a bottom wall of the cowl box and a bottom panel of the mounting assembly.

14. The vehicle as recited in claim 1, wherein a cowl box of the cowl assembly is supported by a dash panel.

15. The vehicle as recited in claim 1, wherein the cowl assembly includes a cowl box, a leaf screen, a front upper panel, and a rear upper panel, and further wherein the mounting assembly is received vertically between the leaf screen and the cowl box and horizontally between the front upper panel and the rear upper panel.

16. A vehicle, comprising:
a windshield;
a cowl assembly positioned at a base of the windshield;
a mounting assembly mounted within an open space of the cowl assembly; and
a supercapacitor housed within the mounting assembly,
wherein at least one panel of the mounting assembly is comprised of a polymer that is reinforced by a structural foam.

17. The vehicle as recited in claim 16, wherein the polymer is polypropylene and the structural foam includes acrylonitrile-butadiene-styrene, polystyrene, polycarbonate, or polyvinyl chloride.

18. The vehicle as recited in claim 16, comprising a thermal pad disposed between a rear panel of the mounting assembly and a rear wall of the cowl assembly.

19. A vehicle, comprising:
a windshield;
a cowl assembly positioned at a base of the windshield;
a mounting assembly mounted within an open space of the cowl assembly; and
a supercapacitor housed within the mounting assembly,
wherein the mounting assembly is a box-shaped housing that includes a front panel, a rear panel, opposing side panels, a top panel, and a bottom panel,
wherein the rear panel is comprised of a thermally conductive polymer,
wherein at least one of the front panel, the opposing side panels, the top panel, or the bottom panel is comprised of a polymer that is reinforced by a structural foam.

20. The vehicle as recited in claim 19, comprising a thermal pad disposed between the rear panel and a rear wall of the cowl assembly.

* * * * *